United States Patent Office 3,202,559
Patented Aug. 24, 1965

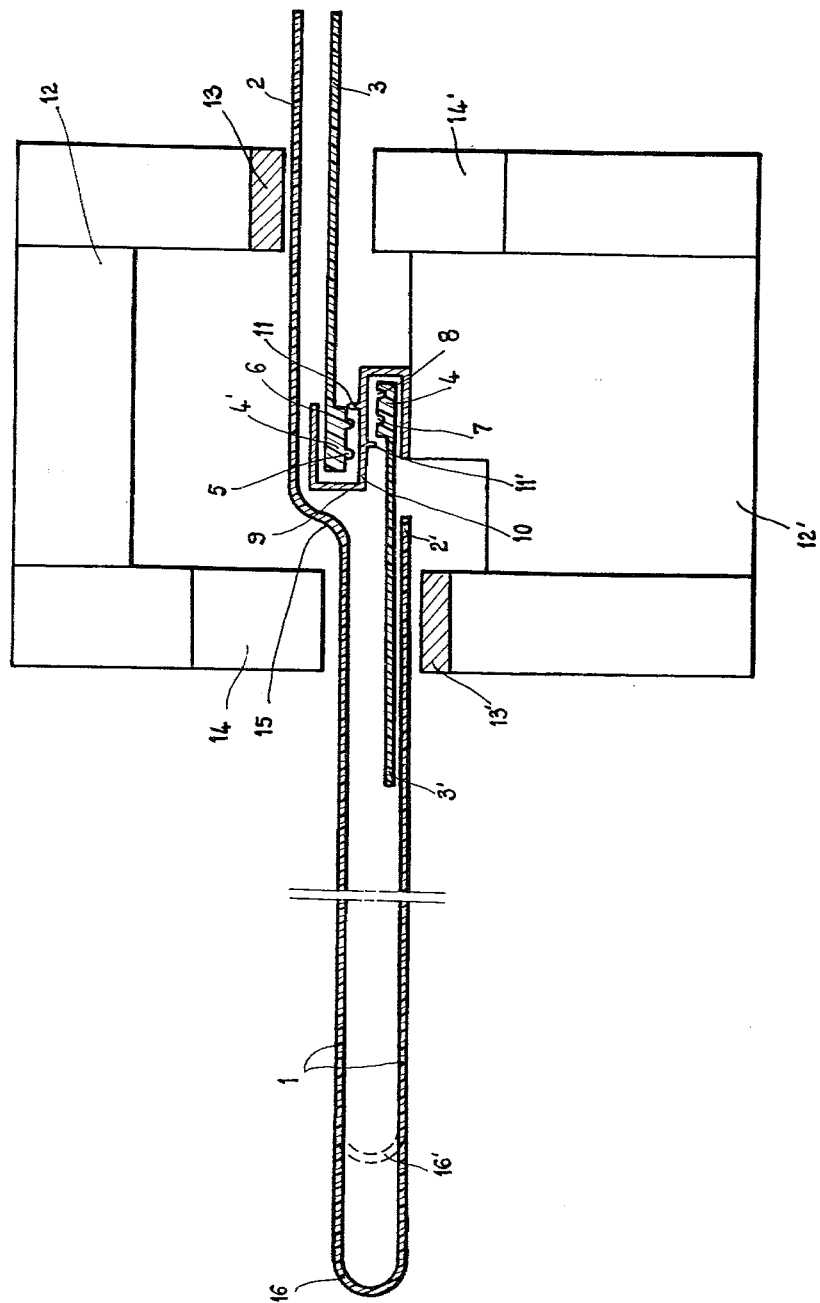

3,202,559
METHOD OF FORMING PLASTIC BAGS WITH SLIDE FASTENER TAPE ASSEMBLIES WELDED THERETO
Leon Ker Laguerre, Boulogne-sur-Seine, France, assignor to Ets. NEB, S.A.R.L., Boulogne-sur-Seine, France, a body corporate of France
Filed Dec. 22, 1960, Ser. No. 77,615
Claims priority, application France, Jan. 19, 1960, 816,043
5 Claims. (Cl. 156—66)

The present invention relates to a process for the securing of shaped fastening strips provided with a slide on small bags made of plastic, particularly of polyethylene. These fastening strips are usually welded on the edges of the mouth of the small bags or pouches, said edges being prepared beforehand, for instance by transversely cutting the film of polyethylene extruded in the shape of a tube and closing by welding one of the ends of each portion thus obtained, or welded on the opposed edges of an elongated rectangular opening cut near one of the edges of the small bags. This process results in a rather difficult handling to introduce and place the strips and hold them in position during the welding and thereby the whole of the operations which are necessary for the setting of these strips requires a rather great length of time.

The present invention is concerned with a process making it possible to accelerate to a great extent the making of these small bags or pouches made of plastic and including a sliding fastening. The process is characterized in that it consists, when starting from a sheet or a continuous cylinder made of plastic, in folding this sheet or cutting this cylinder along a generatrix, in off-setting the edges of the folded sheet or of the opened and flattened tube and in welding the shaped strips on the inner faces of these off-set edges in a head to tail position and in an uninterrupted way and thereafter, in cutting and transversely welding the folded sheet at the required width to form the small bags, preferably by means of welding electrodes cutting the folded sheet or tube thus provided with its fastening device.

The welding is to be warm enough to accurately weld together the edges of the small bag but not too warm as it would prevent the separation of the shaped strips at their end to allow the insertion of the slide.

By way of example, a mode of application of the process according to the invention is described hereafter and schematically illustrated in the annexed drawing showing in cross section a device to carry it into effect.

As shown in the drawing, the sheet made of plastic 1, having any desired length, 50 meters for instance, is folded lengthwise so that its two edges 2, 2' are off-set relative to one another a distance necessary for the placing in position of the two fastening strips 3, 3'. These strips, in a known way, are provided with longitudinal ribs and grooves having complementary profiled sections. Thus the strips have reinforcements 4, 4' provided with opposed ribs and grooves 5, 6 and 7, 8, allowing their mutual elastic interengagement under the pressure delivered by a slide (not shown). The strips 3, 3' having also a great length, are guided by a double rail 9 having in cross section the shape of an S. The two shaped reinforcements 4, 4' of the strips 3, 3', are introduced in a head to tail position in the two parts of the rail 9, the median part 10 of this double rail being provided with two opposed ribs 11, 11', to prevent the parts 4, 4' from escaping from their guides. Of course, instead of a folded sheet, it is possible to use a film of plastic extruded in a continuous tubular shape and to cut the tube along a generatrix and to shift the edges laterally so that they are offset as shown in the drawing.

The upper edge 2 of the sheet is applied on the sheet 3, the lower edge 2' is placed under the strips 3' and the strips 3, 3' are welded on the corresponding edges of the sheet which is folded on a length depending on the welding process. The sheet and the strips are then simultaneously moved along a distance equal to the length of the welded part and the new length is welded in the same way. A continuous, folded sheet provided with fastening strips is thus obtained.

The continuous sheet is thereafter transversely cut in sections each having a length corresponding to the width of the small bags or pouches to be obtained and the transverse edges of this cut sheet are welded. This welding of the transverse edges is carried out so as not to weld the ends of the shaped reinforcements 4, 4' and to allow the insertion, from the outside, of the slide of the fastening device. After the slide is engaged, the strips are united at their ends to prevent the disengagement of the slide. The ends can be connected, for example by clasping means.

In the device illustrated in the drawing, the pressing and the welding of the strips 3, 3' on the off-set edges 2, 2' of the sheet 1 are effected by means of two members 12, 12' in the shape of two opposite horse-shoes, the lower member 12' being stationary and supporting the guiding rail 9 while the upper member 12 is movable vertically. One of the arms in the two members supports at its end a welding electrode 13, 13' in front of which is the insulating end 14, 14' of the other arm, forming a bearing and pressure seat. The arms, the ends of which support the welding electrodes 13, 13' are shorter than the insulating arms, by an amount about half the height of the double guiding rail 9.

It will be seen that, when the member 12 is lowered to press the sheet 1 and the strips 3, 3', a bending of the sheet 1 is formed at 15 so that, if one is not careful, the upper part of the sheet 1 is pulled towards the right, the fold 16 is moved to 16'; and, if it is desired to maintain the fold 16, the two reinforcements 4, 4' would no more be opposite each other. To cope with this difficulty, the two guiding parts of the rail 9 are set off laterally, the upper part, guiding the strip 3, being moved towards the inside of the pouch 1 in relation to the lower part which guides the strip 3'. The shaped reinforcements 4, 4' are thereby placed facing each other after the welding, the initial fold 16 of the sheet remaining unaltered.

The welding electrodes 13, 13' may be constituted by bars, as shown, the sheet 1 and the strips 3, 3' being intermittently displaced after each welding operation, but it is also possible to make use of rotating electrodes in the shape of rollers, the sheet 1 and the strips 3, 3' being in such a case displaced in a constant motion.

The transverse cutting and the welding of the side edges of the pouches are preferably carried out by means of cutting and welding electrodes which are in common use for the manufacturing of articles of this kind. The moving and the guiding of the sheet 1 and of the fastening strips 3, 3' can be carried out either by hand or by means of an automatic control device which is synchronized with the controls of the movements of the welding electrodes.

What is claimed is:
1. A method of manufacturing bags made of plastic material provided on their upper edges with slide fastener tapes formed by profiled strips of plastic material provided with longitudinal ribs and grooves having complementary profiled sections, each groove of one strip being aligned with a corresponding rib of the other strip, whereby the ribs and grooves of one strip are engaged by the slide into the grooves and ribs of the other to close the bag and can be separated by said slide to provide the opening thereof, said method comprising the step of providing a continuous film of plastic material, folding said film along a line parallel to its longitudinal axis and situated in the vicinity thereof whereby the free longitudinal edges of said film are shifted laterally with respect to one another so that one edge portion extends beyond the other, laying the said profiled strips in a head to tail position on the inner faces of said shifted edges respectively, pressing and welding a length of the strips on the respective film edges in the said position, displacing the folded film and the strips longitudinally along a distance equal to the welded length and subsequently welding a new length, whereby the continuous folded film is provided on its edges with continuous fastening strips, thereafter cutting and welding transversely the film provided with fastening strips at regular intervals corresponding to the width of the bags, the transverse weldings being made from the fold forming the bottom of the bag up to the lower edge of the fastening strips, engaging a slide on said strips and firmly connecting both strips together on their ends.

2. A method according to claim 1, comprising the step of connecting the corresponding ends of both strips by clasping.

3. A method according to claim 1, using a continuous tubular film stock of plastic material, comprising the step of laying said film in flat folded position and cutting off a longitudinal strip of material on one side along one of its longitudinal folds.

4. A method of manufacturing bags of plastic sheet material which comprises the steps of providing a continuous film of plastic material having parallel longitudinal edges, folding said film along a line parallel to its longitudinal axis and displaced laterally therefrom so that one edge portion extends a selected distance beyond the others, providing two slide fastener tapes comprising continuous strings of plastic material provided with reinforced edge portions having longitudinal ribs and grooves having complementary profiled sections, each groove of one strip mating with a complementary groove of the other strip whereby the ribs and grooves of said strips are engageable with one another by a slider to close the bag and are disengageable from one another to open the bag, feeding said folded film in a longitudinal direction and simultaneously feeding said strips in the same longitudinal direction at the same rate while guiding said strips to position one of said strips on the inner face of said one edge portion of said film with said reinforced portion toward the fold of said film and with the outer edges of said strip and film substantially coinciding, and to position the other of said strips on the inner face of said other edge portion of said film and extending beyond said other edge portion with said reinforced portion away from said fold, said reinforced portions facing one another, progressively pressing and welding said positioned strips respectively on said edge portions of said film to provide a continuous length of said film with said continuous strips welded thereon, thereafter welding transversely said film provided with said strips at regular intervals corresponding to the width of the bags, the transverse welds extending from the fold forming the bottom of the bags up to the lower edge of said strips, simultaneously cutting said film and strips transversely adjacent said transverse welds to divide said continuous film into individual bags engaging a slide on said strips and thereafter uniting both ends of said strips with one another.

5. A method of manufacturing bags of plastic sheet material which comprises the steps of providing a continuous film of plastic material having parallel longitudinal edges, folding said film along a line parallel to its longitudinal axis and displaced laterally therefrom so that one edge portion extends a selected distance beyond the others, providing two slide fastener tapes comprising continuous strings of plastic material provided with reinforced edge portions having longitudinal ribs and grooves having complementary profiled sections, each groove of one strip mating with a complemetary groove of the other strip whereby the ribs and grooves of said strips are engageable with one another to close the bag and are disengageable from one another to open the bag, feeding said folded film in a longitudinal direction and simultaneously feeding said strips in the same longitudinal direction at the same rate while guiding said strips to position one of said strips on the inner face of said one edge portion of said film with said reinforced portion toward the fold of said film and with the outer edges of said strip and film substantially coinciding, and to position the other of said strips on the inner face of said other edge portion of said film and extending beyond said other edge portion with said reinforced portion away from said fold, said reinforced portions facing one another, progressively pressing and welding said positioned strips respectively on said edge portions of said film to provide a continuous length of said film with said continuous strips welded thereon, and thereafter welding and cutting transversely said film provided with said strips at regular intervals corresponding to the width of the bags, to thereby form said continuous film into individual bags, the transverse weld extending from the fold forming the bottom of the bags up to the lower edge of said strips, so that the ends of said welded fastener tapes at the outer edges of said bags are free for the subsequent insertion of a slide and said ends are connected only after the slide has been inserted.

References Cited by the Examiner

UNITED STATES PATENTS

| | | | |
|---|---|---|---|
| 2,269,419 | 1/42 | Adler et al. | 156—66 |
| 2,658,543 | 11/53 | Budnick | 156—66 XR |
| 2,666,472 | 1/54 | Hosfield | 154—1.6 |
| 2,680,087 | 6/54 | Sundback | 156—66 |
| 2,701,223 | 1/55 | Marcus | 154—118 |
| 2,740,740 | 4/56 | Binnall | 156—251 |
| 2,768,922 | 10/56 | Klein | 156—66 |
| 2,799,611 | 7/57 | Dreisbach | 154—118 |
| 2,878,849 | 3/59 | Lingenfelter et al. | 150—3 |
| 2,978,769 | 4/61 | Harrah | 150—3 XR |
| 2,988,129 | 6/61 | Kevelin et al. | 154—1.6 |
| 3,066,063 | 11/62 | Ecklund et al. | 156—200 |

FOREIGN PATENTS 454,348   1/49   Canada.

EARL M. BERGERT, *Primary Examiner.*

CARL F. KRAFFT, *Examiner.*